United States Patent
Hinoki et al.

(10) Patent No.: US 7,303,975 B2
(45) Date of Patent: *Dec. 4, 2007

(54) METHOD FOR PRODUCING ELECTROCHEMICAL CAPACITOR ELECTRODE

(75) Inventors: Kiyonori Hinoki, Tokyo (JP); Tsuyoshi Ichiki, Tokyo (JP); Kazutoshi Emoto, Tokyo (JP); Takehiko Sasaki, Tokyo (JP); Kenichi Murakami, Wako (JP); Shigeki Oyama, Wako (JP); Manabu Iwaida, Wako (JP)

(73) Assignee: TDK Corporation and Honda Motor Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/436,120

(22) Filed: May 16, 2006

(65) Prior Publication Data

US 2007/0026623 A1 Feb. 1, 2007

(30) Foreign Application Priority Data

May 17, 2005 (JP) .............................. 2005-143556

(51) Int. Cl.
*H01L 21/76* (2006.01)
*H01L 21/20* (2006.01)
*H01G 9/00* (2006.01)
*H01M 6/04* (2006.01)

(52) U.S. Cl. ..................... 438/409; 438/381; 438/400; 29/25.03; 29/623.5; 361/502; 361/503; 429/188; 429/316

(58) Field of Classification Search ................ 438/381, 438/400, 409; 361/502–504, 523, 528; 29/25.03, 29/623.5; 429/188, 316
See application file for complete search history.

(56) References Cited

U.S. PATENT DOCUMENTS

| | | | |
|---|---|---|---|
| 6,426,865 B2* | 7/2002 | Kasahara et al. | ........... 361/512 |
| 2005/0122664 A1* | 6/2005 | Takahashi et al. | .......... 361/530 |
| 2006/0133005 A1* | 6/2006 | Miyaki et al. | ............. 361/272 |

FOREIGN PATENT DOCUMENTS

| | | |
|---|---|---|
| JP | 08-253305 | 10/1996 |
| JP | 11-097306 | 4/1999 |
| JP | 11-345747 | 12/1999 |

* cited by examiner

*Primary Examiner*—Long K. Tran
(74) *Attorney, Agent, or Firm*—Young Law Firm, P.C.

(57) ABSTRACT

A method is provided for optimizing the physical characteristics of a coating solution for a polarizable electrode layer formed on a collector. A first step is carried out to prepare a coating solution that includes porous particles, a fluorine-based binder, a good solvent that dissolves said fluorine-based binder, and a poor solvent that does not dissolve said fluorine-based binder. A second step is carried out to coat a collector with said coating solution to form the polarizable electrode layer on the collector. The viscosity of said coating solution for the polarizable electrode layer is set to between 0.5 to 3.5 Pa·s and a weight ratio (GS/PS) of said good solvent (GS) and said poor solvent (PS) is set to between 60/40 to 80/20. The occurrence of cracks in the polarizable electrode layer and large nonuniformities in the thickness of the polarizable electrode layer can thus be prevented.

12 Claims, 7 Drawing Sheets

METHOD FOR PRODUCING ELECTROCHEMICAL CAPACITOR ELECTRODE

TECHNICAL FIELD

The present invention relates to a method for producing an electrochemical capacitor electrode, and more specifically relates to a method for producing an electrochemical capacitor electrode that is formed by coating a polarizable electrode layer on a collector.

BACKGROUND OF THE INVENTION

In recent years, electric double layer capacitors and other electrochemical capacitors are receiving attention as batteries that are small and lightweight, and in which relatively large capacities can be obtained. An electric double layer capacitor does not use a chemical reaction as does an ordinary secondary battery, and features the capability of very rapid charging and discharging because it is a type of battery that directly stores electric charge on the electrodes.

By making use of such features, there are high expectation for the use of such batteries as a backup power supply for mobile equipment (small electronic equipment) and the like, an auxiliary power supply for electric automobiles and hybrid cars, and as other forms of power supplies, for example, and various forms of research are being carried out in order to improve the performance of such batteries.

An electric double layer capacitor has a basic structure in which electrolytic solution is filled by way of a separator between a pair of collectors in which a polarizable electrode layer is formed. The simplest known method for forming a polarizable electrode layer on a collector is a method of laminating these components together, but this method has a problem in that it is difficult to make the polarizable electrode layer sufficiently thin, and adequate adhesion between the collector and polarizable electrode layer cannot be obtained.

To solve the problems, the collector and polarizable electrode layer are not laminated together, but a coating solution for the polarizable electrode layer is applied to the collector, and the polarizable electrode layer is preferably formed on the collector by drying the fluid. See Japanese Patent Application Laid Open Nos. H8-253305, H11-97306, and H11-345747.

When a polarizable electrode layer is formed by coating, cracks occur in the polarizable electrode layer depending on the solvent that is used. Also, even if the solvent to be used is suitably selected, thickness becomes more nonuniform and, other problems occur that worsen the characteristics of the electrochemical capacitor, depending on the viscosity of the coating solution for the polarizable electrode layer.

SUMMARY OF THE INVENTION

It is therefore an object of the present invention to provide a method for producing an electrochemical capacitor electrode that has good characteristics by optimizing the material and physical characteristics of the coating solution for the polarizable electrode layer.

The above and other objects of the present invention can be accomplished by a method for producing an electrochemical capacitor electrode, comprising the steps of: preparing a coating solution for a polarizable electrode layer that includes porous particles, a fluorine-based binder, a good solvent that dissolves said fluorine-based binder, and a poor solvent that does not dissolve said fluorine-based binder; and coating a collector with said coating solution to form the polarizable electrode layer on the collector, wherein a viscosity of said coating solution for the polarizable electrode layer is set to between 0.5 to 3.5 Pa·s and a weight ratio (GS/PS) of said good solvent (GS) and said poor solvent (PS) is set to between 60/40 to 80/20.

In accordance with the present invention, the physical characteristics and material of the coating solution for the polarizable electrode layer are optimized. Therefore, the occurrence of cracks in the polarizable electrode layer and large nonuniformities in the thickness of the polarizable electrode layer can be prevented.

In the present invention, the good solvent preferably includes methyl isobutyl ketone. The coating solution for the polarizable electrode layer preferably further includes an electroconductive aid.

In the present invention, the method further comprises a step of forming an undercoat layer on said collector prior to forming said polarizable electrode layer on said collector. The undercoat layer can improve the physical and electrical bond between the polarizable electrode layer and the collector.

BRIEF DESCRIPTION OF THE DRAWINGS

The above and other objects, features and advantages of this invention will become more apparent by reference to the following detailed description of the invention taken in conjunction with the accompanying drawings, wherein.

DETAILED DESCRIPTION OF THE EMBODIMENTS

Preferred embodiments of the present invention will now be explained in detail with reference to the drawings.

Figure 1:
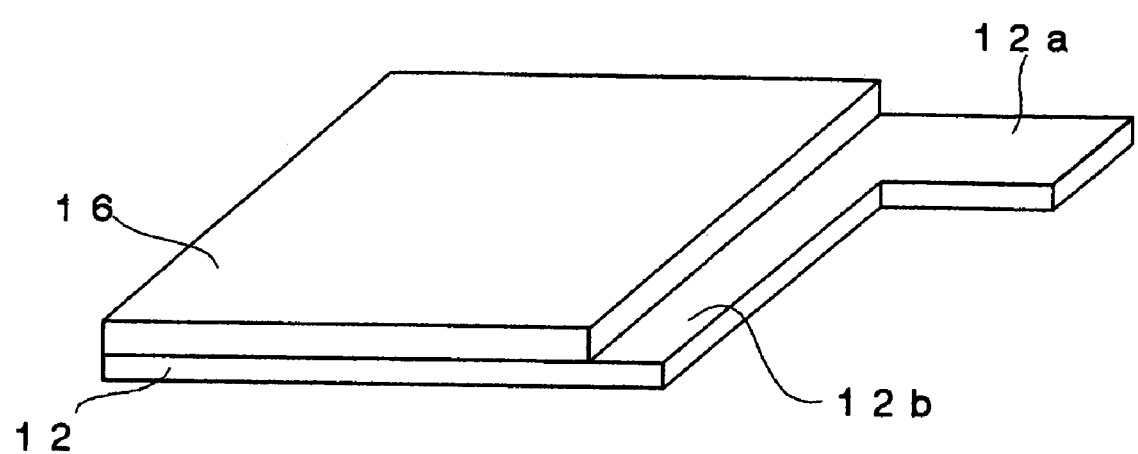
FIG. 1 is a schematic perspective view that shows a structure of an electric double layer capacitor electrode produced by the method of the preferred embodiments of the present invention.

FIG. 1 is a schematic perspective view that shows the structure of an electric double layer capacitor electrode produced by the method of the preferred embodiments of the present invention.

The electric double layer capacitor electrode 10 produced by the method of the present embodiment is provided with a collector 12 having electron conductivity, and a polarizable electrode layer 16 having electron conductivity formed on the collector 12, as shown in FIG. 1. The collector 12 is provided with an extraction electrode 12a, which is a lead.

The material of the collector 12 is not particularly limited as long as the material is a good conductor that can adequately transmit an electric charge to the polarizable electrode layer 16, and a known collector material that is used in electrodes for electric double layer capacitors may be used, an example of which is aluminum (Al). Although it is not particularly limited in the present invention, the surface 12b of the collector 12 has preferably been roughened, and the bond between the collector 12 and polarizable electrode layer 16 has thereby been improved.

The method for roughening the surface of the collector 12 is not particularly limited, but may be one in which the surface is roughened by chemical etching with acid or another chemical. The etching depth is preferably set to about 3 to 7 µm. This is due to the fact that the effect of improving adhesion is substantially lost if the etching is too shallow, and, conversely, it is difficult to uniformly coat the polarizable electrode layer 16 if the etching is excessively deep. There is no particular requirement that the reverse surface of the collector 12 be roughened, but when the polarizable electrode layer 16 are formed on both surfaces of the collector 12, as described later, both surfaces of the collector 12 must be roughened.

The thickness of the collector 12 is also not particular limited, but in order to reduce the size of the electric double layer capacitor that is to be produced, the thickness is preferably set to be as minimal as possible in a range that assures sufficient mechanical strength. More specifically, when aluminum (Al) is used as the material of collector 12, the thickness is preferably set to be 10 µm or greater and 100 µm or less, and even more preferably 15 µm or greater and 50 µm or less. If the thickness of the collector 12 composed of aluminum (Al) is set to be in this range, the electric double layer capacitor that is ultimately manufactured can be made smaller while assuring sufficient mechanical strength.

The polarizable electrode layer 16 is a layer that is formed on the collector 12 and that contributes to the storage and discharge of electric charge. The polarizable electrode layer 16 includes, as constituent materials, at least porous particles having electron conductivity and a binder that can bind the porous particles to each other, and preferably has an electroconductive aid having electron conductivity. The specific materials of the porous particles, binder, and other components constituting the polarizable electrode layer 16 are described later.

From the viewpoint of ensuring a smaller and more lightweight electric double layer capacitor electrode 10, the thickness of the polarizable electrode layer 16 is preferably 50 to 200 µm, and is more preferably 80 to 150 µm. A smaller and more lightweight electric double layer capacitor that is ultimately manufactured can be obtained by setting the thickness of the polarizable electrode layer 16 in the above-described range.

The overall thickness (maximum film thickness) of the electric double layer capacitor electrode 10 having such a structure is preferably 65 to 250 µm, and is more preferably 100 to 180 µm. A smaller and more lightweight electric double layer capacitor that is ultimately manufactured can be achieved by setting the thickness to such a range.

Described above is the structure of an electric double layer capacitor electrode 10 that is manufactured by the production method of the preferred embodiments of the present invention.

Figure 2:
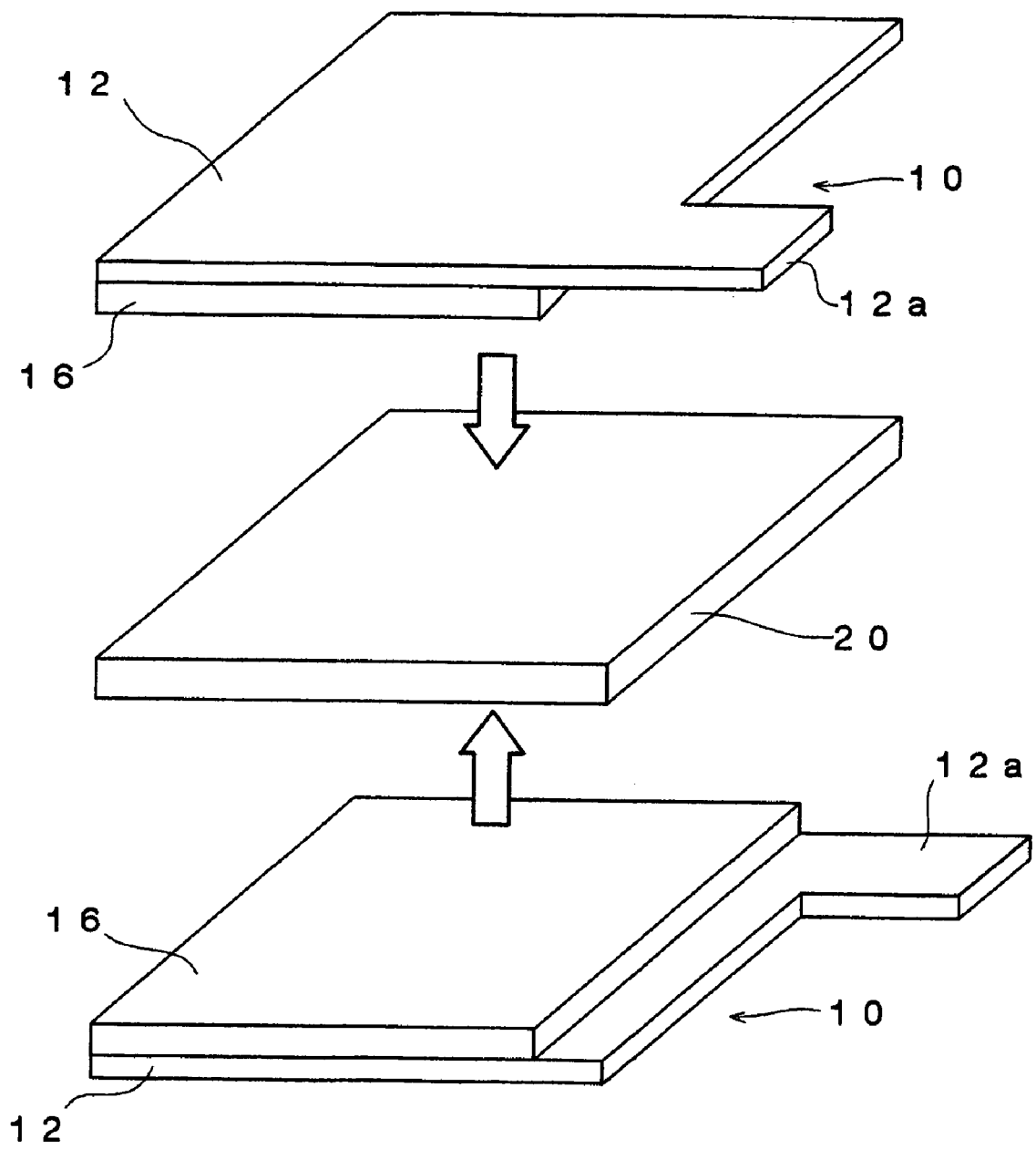
FIG. 2 is a schematic perspective view illustrating the method of manufacturing an electric double layer capacitor using two electric double layer capacitor electrodes shown in FIG. 1.

When an actual electric double layer capacitor is manufactured using such an electric double layer capacitor electrode 10, a separator 20 is inserted between a pair of electric double layer capacitor electrodes 10, as shown in FIG. 2, the structure is placed in a case (not shown), and the product is completed by filling the case with electrolytic solution. An electric double layer capacitor terminated with the extraction electrodes 12a, which are parts of the collectors 12, is thereby obtained.

The separator 20 is a film for physically separating the polarizable electrode layers 16, and 16, while allowing the electrolytic solution to move between the polarizable electrode layers 16 and 16. The separator 20 is preferably formed from a nonconductive porous body, and examples of materials that may be used include a laminated film consisting of polyethylene, polypropylene, or polyolefin; a drawn film composed of a mixture of the above-mentioned resins; or a fiber nonwoven composed of at least one constituent material selected from the group consisting of cellulose, polyester, and polypropylene. The thickness of the separator 20 is not particularly limited, but is preferably 15 µm or greater and 200 µm or less, and is more preferably 30 µm or greater and 100 µm or less.

An electrolytic solution that is used in known electric double layer capacitors can be used in this case. For example, electrolytic aqueous solution or electrolytic solution using an organic solvent can be used.

However, since the withstand voltage of the capacitor is limited because of the electrochemically low decomposition voltage, the electrolytic solution used in electric double layer capacitors is preferably an electrolytic solution in which an organic solvent (non-aqueous electrolyte solution) is used. The specific type of electrolytic solution is not limited, but the electrolytic solution is preferably selected with consideration given to the solubility of the solute, the degree of dissociation, and the viscosity of the fluid.

Particularly preferred is an electrolytic solution that is highly conductive and that has a high electric potential window (a high decomposition start voltage). Typical examples include solutions in which a quaternary ammonium salt such as tetraethylammonium tetrafluoroborate is dissolved in propylene carbonate, diethylene carbonate, acetonitrile, or another organic solvent. In this case, contamination with moisture must be strictly controlled.

Figure 3:
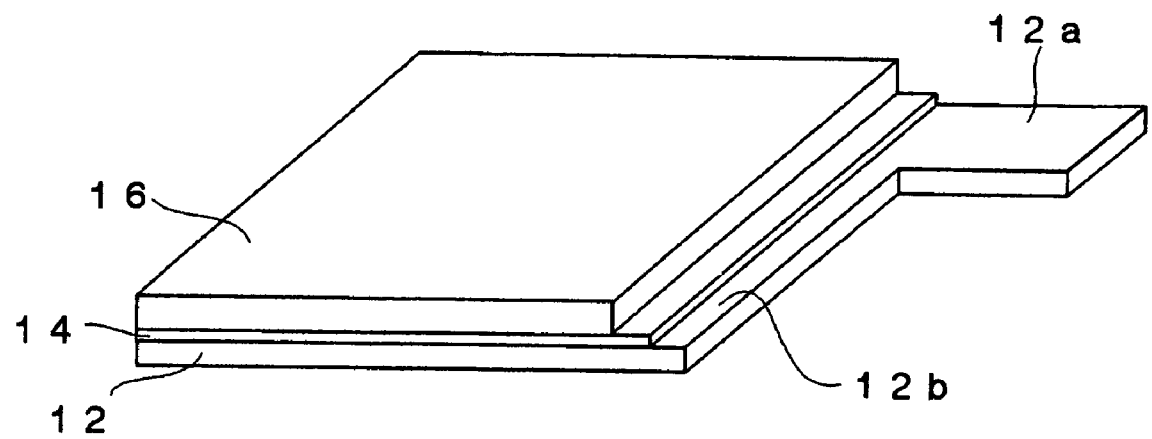
FIG. 3 is a schematic perspective view that shows a structure of an electric double layer capacitor electrode provided with an undercoat layer.

As shown in FIG. 3, the undercoat layer 14 can be disposed between the collector 12 and the polarizable electrode layer 16 in order to improve the physical and electrical bond between these components. A material with high electroconductive properties is preferably used for the undercoat layer 14 in order to prevent an increase in internal resistance. The undercoat layer 14 can include electroconductive particles and a binder that can bind the electroconductive particles together.

The overall thickness of the undercoat layer 14 is preferably made as minimal as possible, and from the aspect of preventing an increase in the internal resistance of the electric double layer capacitor electrode 10, the thickness is preferably as minimal as possible in a range that allows the collector 12 and polarizable electrode layer 16 to be sufficiently bondable. Specifically, the preferred thickness is 0.2 µm or greater and 10 µm or less.

Described in detail next is the production method of the preferred embodiments of the present invention.

Figure 4:
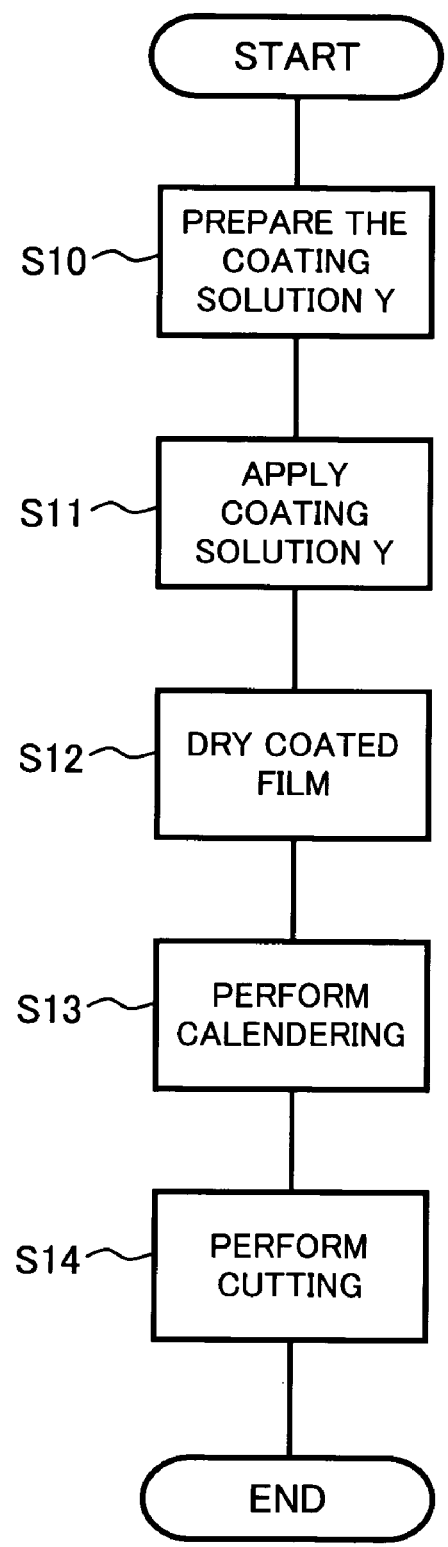
FIG. 4 is a flowchart describing the manufacturing method of the electric double layer capacitor electrode of the preferred embodiments of the present invention.

FIG. 4 is a flowchart describing the production method of the electric double layer capacitor electrode 10 of the preferred embodiments of the present invention. Described below is the production method of the electric double layer capacitor electrode 10 of the present embodiment with reference to the flowchart.

Prepared first are the coating solution that is the material of the polarizable electrode layer 16, i.e., the coating solution Y for the polarizable electrode layer 16 (step S10).

Figure 5:
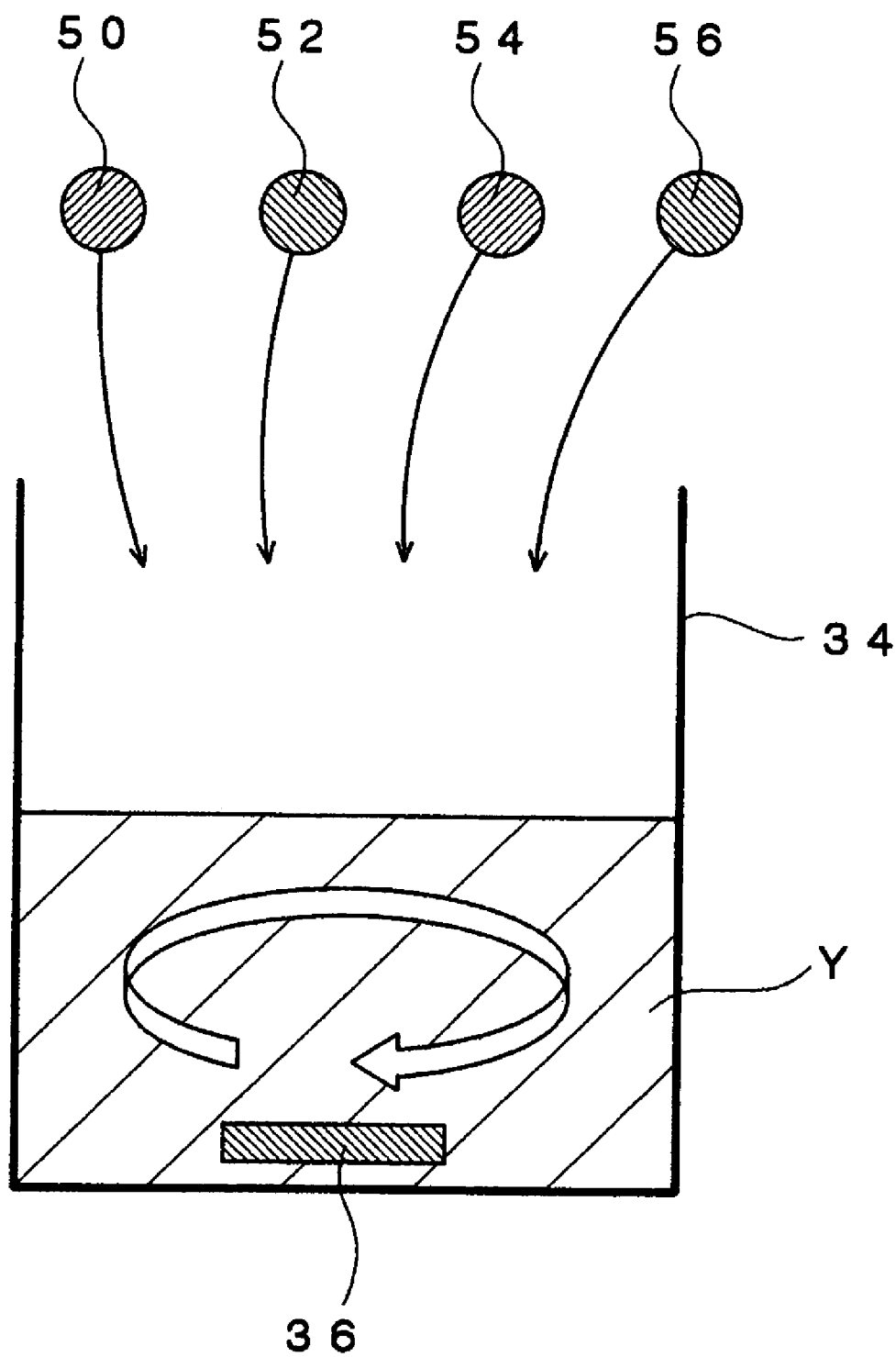
FIG. 5 is a schematic diagram illustrating the method of preparing the coating solution for a polarizable electrode layer.

The coating solution Y for the polarizable electrode layer is prepared in the following manner. First, porous particles 50, a binder 52, and a solvent 54 are loaded into a mixing apparatus 34 provided with a stirring unit 36, as shown in FIG. 5. The coating solution Y for the polarizable electrode layer can then be prepared by stirring the components using the stirring unit 36.

The preparation of the coating solution Y for the polarizable electrode layer preferably includes a kneading operation and/or a dilution mixing operation. As referred to herein, the term "kneading" refers to the kneading together of materials by stirring with the liquid in a relatively high viscous state, and the term "dilution mixing" refers to adding solutions and the like to the kneaded liquid and mixing the mixture in a relatively low viscous state. The time and temperature of these operations are not particularly limited, but from the viewpoint of obtaining a uniformly dispersed state, the kneading time is preferably about 30 minutes to 2 hours, the temperature during kneading is preferably about 40 to 80° C., the dilution mixing time is preferably about 1 to 5 hours, and the temperature during dilution mixing is preferably about 20 to 50° C.

The porous particles 50 included in the coating solution Y for the polarizable electrode layer are not particularly limited as long as the porous particles have electron conductivity that contributes to the storage and discharge of electric charge. An example of such particles is reactivated carbon or the like in the form of particles or fibers. Phenol-based activated carbon, coconut shell activated carbon, or the like may be used. The average diameter of the porous particles is preferably 3 to 20 μm, and the BET specific surface area that is determined from the nitrogen adsorption isotherm by using the BET adsorption isotherm is preferably 1,500 $m^2/g$ or greater and is more preferably 2,000 to 2,500 $m^2/g$. Using such porous particles 50 makes it possible to obtain a high volume capacity.

The binder 52 included in the coating solution Y for the polarizable electrode layer must be a binder that can bind the porous particles 50. Polytetrafluoroethylene (PTFE), polyvinylidene fluoride (PVDF), fluorine rubber, or another fluorine-based binder must be used. This is due to the fact that cellulose-based binders and acrylic binders are electrochemically inferior to fluorine-based binders due to differences in the bond energy of C—F and C—H, and other factors. Particularly preferred among these fluorine-based binders is fluorine rubber. This is due to the fact that the use of fluorine rubber allows the porous particles to bind adequately, even if a small amount is used; and the strength of the coated film of the polarizable electrode layer 16 can thereby be enhanced, the size of the double layer interface can be improved, and the volume capacity can be increased. Also, fluorine rubber is electrochemically stable.

Examples of fluorine rubber include vinylidene fluoride-hexafluoropropylene-tetrafluoropropylene (VDF-HFP-TFE) copolymers, vinylidene fluoride-hexafluoropropylene (VDF-HFP) copolymers, vinylidene fluoride-pentafluoropropylene (VDF-PFP) copolymers, vinylidene fluoride-pentafluoropropylene-tetrafluoroethylene (VDF-PFP-TFE) copolymers, vinylidene fluoride-perfluoromethyl vinyl ether-tetrafluoroethylene (VDF-PFMVE-TFE) copolymers, vinylidene fluoride-chlorotrifluoroethylene (VDF-CTFE) copolymers, ethylene-tetrafluoroethylene copolymers, and propylene-tetrafluoroethylene copolymers.

Particularly preferred among these is a fluorine rubber in which at least two types selected from the group consisting of VDF, HFP, and TFE are copolymerized. Particularly preferred are VDF-HFP-TFE copolymers in which the three types in the above-mentioned group are copolymerized, because the adhesion and chemical resistance tend to be further improved.

The solvent 54 included in the coating solution Y for the polarizable electrode layer must be a mixed solvent composed of methylethyl ketone (MEK), methylisobutyl ketone (MIBK), or another ketone-based solvent, or another good solvent, and propylene carbonate, ethylene carbonate, or another poor solvent. The required weight ratio (GS/PS) of the good solvent (GS) and poor solvent (PS) will be explained later.

An electroconductive aid 56 is preferably added as required to the coating solution Y for the polarizable electrode layer. The electroconductive aid 56 is not particularly limited as long as it has electron conductivity that allows adequate movement of electric charge between the collector 12 and polarizable electrode layer 16. An example of such an aid is carbon black and graphite.

Examples of carbon black that may be used include acetylene black, Ketjen black, and furnace black, but preferably among these is acetylene black. The average particle size of the carbon black is preferably 25 to 50 nm. The BET specific surface area that is determined from the nitrogen adsorption isotherm by using the BET adsorption isotherm is preferably 50 $m^2/g$ or greater, and is more preferably 50 to 140 $m^2/g$.

Also, examples of graphite include natural graphite, artificial graphite, and expanded graphite, and the use of artificial graphite is especially preferred. The average particle diameter of graphite is preferably 4 to 6 μm. The BET specific surface area is preferably 10 $m^2/g$ or greater, and is more preferably 15 to 30 $m^2/g$.

The ratios of the porous particles 50, binder 52, and solvent 54 that are included in the coating solution Y for the polarizable electrode layer, and the optionally added electroconductive aid 56 are not particularly limited, but the viscosity of the coating solution Y for the polarizable electrode layer must be 0.5 to 3.5 Pa·s. The weight ratio (GS/PS) of the good solvent (GS) and poor solvent (PS) must be 60/40 to 80/20.

These are the required conditions for effectively preventing cracks from occurring in the polarizable electrode layer 16, and for smoothing the surface of the polarizable electrode layer 16. In other words, if the GS/PS ratio of the coating solution Y for the polarizable electrode layer is less than 60/40, the possibility that cracks will occur in the polarizable electrode layer 16 due to insufficient binder 52 dissolution will increase, and if the GS/PS ratio of the coating solution Y for the polarizable electrode layer is greater than 80/20, or if the viscosity of the coating solution Y for the polarizable electrode layer is less than 0.5 Pa·s or in excess of 3.5 Pa·s, the surface characteristics of the polarizable electrode layer 16 will be reduced due to the degraded coating conditions, and considerable nonuniformities are liable to occur in the film thickness.

In contrast, when the coating solution Y for the polarizable electrode layer satisfies the above-described conditions, the occurrence of such deficiencies can be suppressed, and an excellent polarizable electrode layer 16 can be formed. In particular, the viscosity of the coating solution Y for the polarizable electrode layer is preferably 1.0 to 1.5 Pa·s, and the GS/PS ratio is preferably about 70/30. An even better polarizable electrode layer 16 can thereby be formed.

Therefore, the materials and ratios of the porous particles 50, binder 52, and solvent 54 that are included in the coating solution Y for the polarizable electrode layer, and the optionally added electroconductive aid 56 must be selected so as to satisfy the above-described conditions.

After the coating solution Y for the polarizable electrode layer is thus prepared (step S10), a coated film is subsequently formed by coating the coating solution Y for the polarizable electrode layer on the surface 12b of the collector 12 (step S11), and the solvent 54 included in the coated film is removed by drying (step S12).

Known application methods may be used without particular limitation to apply the coating solution Y for the polarizable electrode layer. Examples of methods that may be adopted include extrusion nozzle, extrusion lamination, doctor blades gravure rolling, reverse rolling, applicator coating, kiss coating, bar coating, and screen printing. Among these methods, the extrusion nozzle method is preferred because of particular consideration related to the viscosity of the coating solution, changes in the coating solution (there is a tendency for the viscosity to increase due to the volatilization of the solution in an open method), and the thickness stability of the polarizable electrode layer 16.

The coated film may be dried by heating for a prescribed length of time. The drying may be specifically carried out at 70 to 130° C. for 0.1 to 10 minutes. An electrode sheet in which the polarizable electrode layer 16 is laminated onto the collector 12 can be obtained by the above-described process.

Next, the electrode sheet is calendered using a roll press, and the polarizable electrode layer 16 is thereby compressed (step S13). This step is designed to increase the volume capacity by compressing the polarizable electrode layer 16, and the calendering process is preferably repeated a plurality of times in order to increase the volume capacity.

Figure 6:
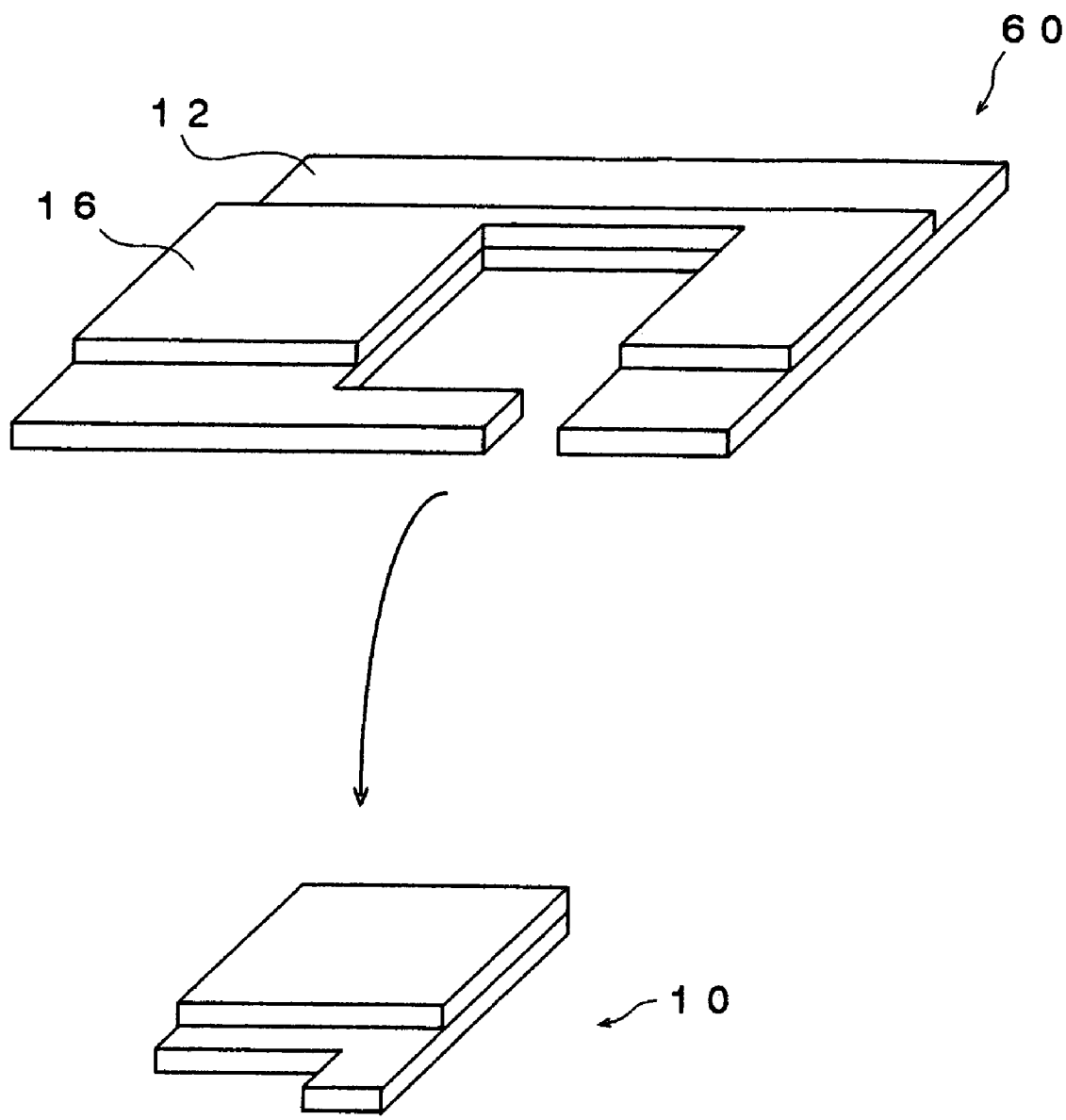
FIG. 6 is a schematic diagram illustrating the method for cutting out an electric double layer capacitor electrode shown in FIG. 1 from an electrode sheet.

The calendered electrode sheet 60 is then cut to the required size and shape (step S14), as shown in FIG. 6, to complete the electric double layer capacitor electrode 10 shown in FIG. 1. A separator 20 is thereafter inserted between a pair of such electric double layer capacitor electrodes 10, as described in FIG. 2, and the unit is placed in a case (not shown). The case is then filled with an electrolytic solution to complete an electric double layer capacitor.

In the present embodiment, the viscosity of the coating solution Y for the polarizable electrode layer is 0.5 to 3.5 Pa·s, or preferably 1.0 to 1.5 Pa·s, and the weight ratio (GS/PS) of the good solvent (GS) and poor solvent (PS) is 60/40 to 80/20, or preferably about 70/30. Therefore, cracks are less likely to occur in the polarizable electrode layer 16 after drying because of insufficient binder 52 dissolution, and situations are prevented in which the thickness of the polarizable electrode layer 16 becomes markedly nonuniform due to degraded coating conditions.

Figure 7:
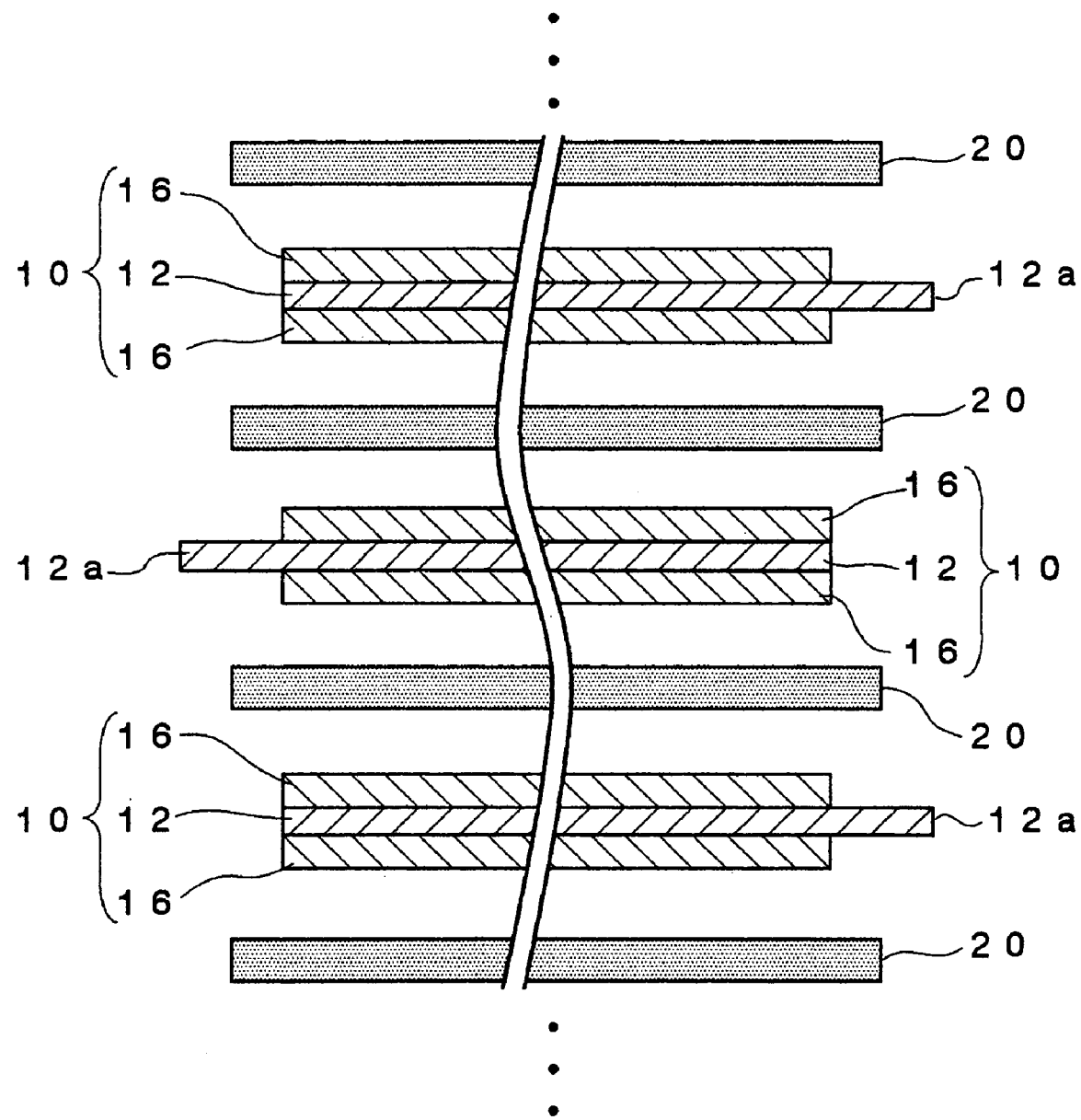
FIG. 7 is a schematic diagram illustrating the method of manufacturing a high-capacity electric double layer capacitor using an electric double layer capacitor electrode shown in FIG. 1 in which a polarizable electrode layer are formed on both sides of a collector.

In the above-described embodiments, the polarizable electrode layer 16 was formed only on one side of the collector 12, but if these components are formed on both sides of the collector 12, separators 20 can be inserted between each of a large number of layers of electric double layer capacitor electrodes 10, and the extraction electrodes 12a of the collectors 12 can be alternately brought out to manufacture an electric double layer capacitor with a larger capacity, as shown in FIG. 7.

The present invention is in no way limited to the aforementioned embodiments, but rather various modifications are possible within the scope of the invention as recited in the claims, and naturally these modifications are included within the scope of the invention.

For example, the electrochemical capacitor electrode produced by the present invention can be used as an electrode for an electric double layer capacitor, as well as an electrode for a pseudo-capacity capacitor, a pseudo capacitor, a redox capacitor, and various other electrochemical capacitors.

EXAMPLES

Examples of the present invention are described below, but the present invention is not limited in any manner by the examples.

Working Example 1

The porous particles used in the coating solution Y for the polarizable electrode layer were prepared by mixing 87 parts by weight of granular activated carbon (product name: RP-20, manufactured by Kuraray Chemical) and 3 parts by weight of acetylene black (product name: Denka Black manufactured by Denki Kagaku Kogyo) as an electroconductive aid for 15 minutes by using a planetary disperser. Further added to the entire weight of the mixture were 10 parts by weight of fluorine rubber (product name: Viton-GF manufactured by DuPont Dow Elastomer) as a binder, 51.1 parts by weight of MIBK (good solvent) as a solvent, and 81 parts by weight of propylene carbonate (poor solvent), and the mixture was kneaded for 45 minutes by a planetary disperser.

Furthermore, 137.9 parts by weight of MIBK (good solvent) as a solvent were added to the mixture, and the mixture was stirred for four hours to prepare the coating solution Y for the polarizable electrode layer. The weight ratio (GS/PS) of the good solvent (GS) and poor solvent (PS) was 70/30.

The viscosity of the resulting coating solution Y for the polarizable electrode layer was subsequently measured using the following method. First, the shear rate was measured using a viscometer (product name: MR-300 manufactured by Rheology) as the measuring apparatus. Next, the viscosity (V10) was calculated at a shear rate of 10 $s^{-1}$ from the measured shear rate by using the Ostwald flow equation.

[Shear stress]=k·[Shear rate]$^n$

Used as the measurement jig was a cone plate with a cone radius of 39.97 mm and a cone angle of 1.92 deg. A wire with a diameter of 1.6 mm was used and measurement was continuously carried out at a maximum shear rate of 300 $s^{-1}$. The measurement was performed at 25° C. and was started two minutes after the coating solution (25° C.) was gathered.

As a result of such measurements, the viscosity of the resulting coating solution Y for the polarizable electrode layer was 1.2 Pa·s.

Next, a polarizable electrode layer was formed to a thickness of 115 μm by applying the resulting coating solution Y for the polarizable electrode layer to the surface of aluminum foil, which was the collector, at a rate of 16 m/min using the extrusion nozzle method, and drying the layer in a drying oven at 120° C. Aluminum foil having a thickness of 20 μm was used.

The electrode sheet sample of working example 1 was thereby completed.

Working Example 2

The electrode sheet sample of working example 2 was manufactured in the same manner as in working example 1 except that the ratio of the solvents was changed so that the weight ratio (GS/PS) of the good solvent (GS) and poor solvent (PS) was 60/40 while the viscosity was kept at 1.2 Pa·s in the preparation of the coating solution Y for the polarizable electrode layer of working example 1.

Working Example 3

The electrode sheet sample of working example 3 was manufactured in the same manner as in working example 1 except that the ratio of the solvents was changed so that the weight ratio (GS/PS) of the good solvent (GS) and poor solvent (PS) was 80/20 while the viscosity was kept at 1.2 Pa·s in the preparation of the coating solution Y for the polarizable electrode layer of working example 1.

Working Example 4

The electrode sheet sample of working example 4 was manufactured in the same manner as in working example 1 except that the amount of solvent was changed so that the viscosity was 0.5 Pa·s while the weight ratio (GS/PS) of the good solvent (GS) and poor solvent (PS) was kept at 70/30 in the preparation of the coating solution Y for the polarizable electrode layer of working example 1.

Working Example 5

The electrode sheet sample of working example 5 was manufactured in the same manner as in working example 1 except that the amount of solvent was changed so that the viscosity was 3.3 Pa·s while the weight ratio (GS/PS) of the good solvent (GS) and poor solvent (PS) was kept at 70/30 in the preparation of the coating solution Y for the polarizable electrode layer of working example 1.

Working Example 6

The electrode sheet sample of working example 6 was manufactured in the same manner as in working example 1 except that the amount of solvent was changed so that the viscosity was 0.5 Pa·s and so that the weight ratio (GS/PS) of the good solvent (GS) and poor solvent (PS) was 80/20 in the preparation of the coating solution Y for the polarizable electrode layer of working example 1.

Working Example 7

The electrode sheet sample of working example 7 was manufactured in the same manner as in working example 1 except that the amount of solvent was changed so that the viscosity was 3.3 Pa·s and so that the weight ratio (GS/PS) of the good solvent (GS) and poor solvent (PS) was 80/20 in the preparation of the coating solution Y for the polarizable electrode layer of working example 1.

Working Example 8

The electrode sheet sample of working example 8 was manufactured in the same manner as in working example 1 except that the amount of solvent was changed so that the viscosity was 0.5 Pa·s and so that the weight ratio (GS/PS) of the good solvent (GS) and poor solvent (PS) was 60/40 in the preparation of the coating solution Y for the polarizable electrode layer of working example 1.

Working Example 9

The electrode sheet sample of working example 9 was manufactured in the same manner as in working example 1 except that the amount of solvent was changed so that the viscosity was 3.3 Pa·s and so that the weight ratio (GS/PS) of the good solvent (GS) and poor solvent (PS) was 60/40 in the preparation of the coating solution Y for the polarizable electrode layer of working example 1.

Comparative Example 1

The electrode sheet sample of comparative example 1 was manufactured in the same manner as in working example 1 except that the ratio of the solvents was changed so that the weight ratio (GS/PS) of the good solvent (GS) and poor solvent (PS) was 50/50 while the viscosity was kept at 1.2 Pa·s in the preparation of the coating solution Y for the polarizable electrode layer of working example 1.

Comparative Example 2

The electrode sheet sample of comparative example 2 was manufactured in the same manner as in working example 1 except that the ratio of the solvents was changed so that the weight ratio (GS/PS) of the good solvent (GS) and poor solvent (PS) was 90/10 while the viscosity was kept at 1.2 Pa·s in the preparation of the coating solution Y for the polarizable electrode layer of working example 1.

Comparative Example 3

The electrode sheet sample of comparative example 3 was manufactured in the same manner as in working example 1 except that the amount of solvent was changed so that the viscosity was 0.3 Pa·s while the weight ratio (GS/PS) of the good solvent (GS) and poor solvent (PS) was kept at 70/30 in the preparation of the coating solution Y for the polarizable electrode layer of working example 1.

Comparative Example 4

The electrode sheet sample of comparative example 4 was manufactured in the same manner as in working example 1 except that the amount of solvent was changed so that the viscosity was 4.0 Pa·s while the weight ratio (GS/PS) of the good solvent (GS) and poor solvent (PS) was kept at 70/30 in the preparation of the coating solution Y for the polarizable electrode layer of working example 1.

Comparative Example 5

The electrode sheet sample of comparative example 5 was manufactured in the same manner as in working example 1 except that the amount of solvent was changed so that the viscosity was 0.3 Pa·s and so that the weight ratio (GS/PS) of the good solvent (GS) and poor solvent (PS) was 90/10 in the preparation of the coating solution Y for the polarizable electrode layer of working example 1.

Comparative Example 6

The electrode sheet sample of comparative example 6 was manufactured in the same manner as in working example 1 except that the amount of solvent was changed so that the viscosity was 4.0 Pa·s and so that the weight ratio (GS/PS) of the good solvent (GS) and poor solvent (PS) was 90/10 in the preparation of the coating solution Y for the polarizable electrode layer of working example 1.

Comparative Example 7

The electrode sheet sample of comparative example 7 was manufactured in the same manner as in working example 1 except that the amount of solvent was changed so that the viscosity was 0.3 Pa·s and so that the weight ratio (GS/PS) of the good solvent (GS) and poor solvent (PS) was 50/50 in the preparation of the coating solution Y for the polarizable electrode layer of working example 1.

Comparative Example 8

The electrode sheet sample of comparative example 8 was manufactured in the same manner as in working example 1 except that the amount of solvent was changed so that the viscosity was 4.0 Pa·s and so that the weight ratio (GS/PS) of the good solvent (GS) and poor solvent (PS) was 50/50 in the preparation of the coating solution Y for the polarizable electrode layer of working example 1.

TABLE 1 shows the viscosity and the weight ratio (GS/PS) of the coating solution Y for the polarizable electrode layer used in working examples 1 to 9 and comparative examples 1 to 8.

TABLE 1

| | GS/PS | VISCOSITY (V10) [Pa·s] | EXISTENCE OF CRACKS | THICKNESS ELEVATION DIFFERENCE [μm] |
|---|---|---|---|---|
| WORKING EXAMPLE 1 | 70/30 | 1.2 | NO | 3 |
| WORKING EXAMPLE 2 | 60/40 | 1.2 | NO | 3 |
| WORKING EXAMPLE 3 | 80/20 | 1.2 | NO | 5 |
| WORKING EXAMPLE 4 | 70/30 | 0.5 | NO | 6 |
| WORKING EXAMPLE 5 | 70/30 | 3.3 | NO | 4 |
| WORKING EXAMPLE 6 | 80/20 | 0.5 | NO | 7 |
| WORKING EXAMPLE 7 | 80/20 | 3.3 | NO | 4 |
| WORKING EXAMPLE 8 | 60/40 | 0.5 | NO | 5 |
| WORKING EXAMPLE 9 | 60/40 | 3.3 | NO | 5 |
| COMPARATIVE EXAMPLE 1 | 50/50 | 1.2 | YES | — |
| COMPARATIVE EXAMPLE 2 | 90/10 | 1.2 | NO | 13 |
| COMPARATIVE EXAMPLE 3 | 70/30 | 0.3 | NO | 16 |
| COMPARATIVE EXAMPLE 4 | 70/30 | 4.0 | NO | 10 |
| COMPARATIVE EXAMPLE 5 | 90/10 | 0.3 | NO | 25 |
| COMPARATIVE EXAMPLE 6 | 90/10 | 4.0 | NO | 10 |
| COMPARATIVE EXAMPLE 7 | 50/50 | 4.0 | YES | — |
| COMPARATIVE EXAMPLE 8 | 50/50 | 0.3 | YES | — |

Existence of Cracks

The polarizable electrode layer was visually checked for cracks in the coated film for the electrode sheet samples of working examples 1 to 9 and the electrode sheet samples of comparative examples 1 to 8.

As a result, no cracks were observed in the polarizable electrode layer in the electrode sheet samples of working examples 1 to 9, but cracks were observed in the polarizable electrode layer in the electrode sheet samples of comparative examples 1, 7, and 8, as shown in TABLE 1. This was thought to be caused by an excessively low (=the amount of good solvent insufficient with respect to the amount of poor solvent) GS/PS ratio (=50/50) of the coating solution Y for the polarizable electrode layer that was used in comparative examples 1, 7, and 8.

Evaluation of Nonuniformity of Film Thickness

Thickness nonuniformity in the coated film was evaluated by measuring the thickness of the polarizable electrode layer for the electrode sheet samples of working examples 1 to 9 and the electrode sheet samples of comparative examples 2 to 6. The electrode sheet samples of comparative examples 1, 7, and 8 were not included in the evaluation of thickness nonuniformities because cracks were observed in the polarizable electrode layer.

The measurement was carried out at 10 locations in the widthwise direction and 10 locations in the lengthwise direction for a total of 20 locations, and the difference (thickness elevation difference) between the maximum thickness and the minimum thickness was evaluated.

The evaluation results are shown in the same TABLE 1. In the electrode sheet samples of working examples 1 to 9, the thickness elevation differences were 6 μm or less, and the thickness elevation differences in working examples 1 and 2 in particular were very good; that is, the thickness elevation differences were 3 μm, as shown in TABLE 1.

In contrast, the thickness elevation differences were considerable in the electrode sheet samples of comparative examples 2 to 6, and the presence of large thickness nonuniformities was confirmed in the coated film. This was thought to be caused by at least one of the viscosity and GS/PS ratio of the coating solution Y for the polarizable electrode layer that was used in comparative examples 2 to 6 is not good.

Summary

It was thereby confirmed that the polarizable electrode layer is free of cracking and that there are no considerable nonuniformities in the thickness of the polarizable electrode layer as long as the viscosity of the coating solution Y for the polarizable electrode layer is 0.5 to 3.5 Pa·s, and the weight ratio (GS/PS) of the good solvent (GS) and poor solvent (PS) is 60/40 to 80/20. On the other hand, it was confirmed that when the above conditions are not satisfied, cracks occur, thickness nonuniformities increase, and other problems are encountered.

What is claimed is:

1. A method for producing an electrochemical capacitor electrode, comprising the steps of:
    preparing a coating solution for a polarizable electrode layer that includes porous particles, a fluorine-based binder, a good solvent that dissolves said fluorine-based binder, and a poor solvent that does not dissolve said fluorine-based binder; and
    coating a collector with said coating solution to form the polarizable electrode layer on the collector,
    wherein a viscosity of said coating solution for the polarizable electrode layer is set to between 0.5 to 3.5 Pa·s and a weight ratio (GS/PS) of said good solvent (GS) and said poor solvent (PS) is set to between 60/40 to 80/20.

2. The method for producing an electrochemical capacitor electrode as claimed in claim 1, wherein said good solvent includes methyl isobutyl ketone.

3. The method for producing an electrochemical capacitor electrode as claimed in claim 2, wherein said coating solution for the polarizable electrode layer further includes an electroconductive aid.

4. The method for producing an electrochemical capacitor electrode as claimed in claim 2, said method further comprising a step of forming an undercoat layer on said collector prior to forming said polarizable electrode layer on said collector.

5. The method for producing an electrochemical capacitor electrode as claimed in claim 1, wherein said coating solution for the polarizable electrode layer further includes an electroconductive aid.

6. The method for producing an electrochemical capacitor electrode as claimed in claim 5, said method further comprising a step of forming an undercoat layer on said collector prior to forming said polarizable electrode layer on said collector.

7. The method for producing an electrochemical capacitor electrode as claimed in claim 1, said method further comprising a step of forming an undercoat layer on said collector prior to forming said polarizable electrode layer on said collector.

8. The method for producing an electrochemical capacitor electrode as claimed in claim 7, wherein said undercoat layer is formed by coating said collector with a coating solution for the undercoat layer that includes at least electroconductive particles, a binder, and a solvent,
    a viscosity of said coating solution for the undercoat layer is set to from 0.15 to 0.75 Pa·s and a weight ratio (P/B) of said electroconductive particles (P) and said binder (B) is set to from 20/80 to 40/60.

9. The method for producing an electrochemical capacitor electrode as claimed in claim 8, wherein said electroconductive particles includes acetylene black.

10. The method for producing an electrochemical capacitor electrode as claimed in claim 8, wherein said binder is a fluorine-based binder.

11. The method for producing an electrochemical capacitor electrode as claimed in claim 8, wherein said solvent includes a good solvent that dissolves said binder and a poor solvent that does not dissolve said binder.

12. The method for producing an electrochemical capacitor electrode as claimed in claim 8, wherein said solvent includes methyl isobutyl ketone.

* * * * *